US012779393B2

(12) United States Patent
Tanthana et al.

(10) Patent No.: US 12,779,393 B2
(45) Date of Patent: Nov. 3, 2026

(54) NON-AQUEOUS SOLVENT FOR REMOVING ACIDIC GAS FROM A PROCESS GAS STREAM FOR HIGH PRESSURE APPLICATIONS

(71) Applicant: Research Triangle Institute, Research Triangle Park, NC (US)

(72) Inventors: Jak Tanthana, Durham, NC (US); Shaojun James Zhou, Cary, NC (US); Paul Mobley, Raleigh, NC (US); Vijay Gupta, Cary, NC (US); Marty Lail, Raleigh, NC (US); Aravind Villava Rayer Rabindran, Morrisville, NC (US); Thomas Gohndrone, Research Triangle Park, NC (US)

(73) Assignee: Research Triangle Institute, Research Triangle Park (NC)

( * ) Notice: Subject to any disclaimer, the term of this patent is extended or adjusted under 35 U.S.C. 154(b) by 772 days.

(21) Appl. No.: 17/782,296

(22) PCT Filed: Dec. 9, 2020

(86) PCT No.: PCT/US2020/063892

§ 371 (c)(1),
(2) Date: Jun. 3, 2022

(87) PCT Pub. No.: WO2021/119058

PCT Pub. Date: Jun. 17, 2021

(65) Prior Publication Data

US 2023/0001348 A1 Jan. 5, 2023

Related U.S. Application Data

(60) Provisional application No. 62/946,737, filed on Dec. 11, 2019.

(51) Int. Cl.
*B01D 53/14* (2006.01)
*C10L 3/10* (2006.01)

(52) U.S. Cl.
CPC ..... *B01D 53/1493* (2013.01); *B01D 53/1475* (2013.01); *C10L 3/104* (2013.01); *B01D 2252/2025* (2013.01); *B01D 2252/20405* (2013.01); *B01D 2252/20426* (2013.01); *B01D 2252/20447* (2013.01); *B01D 2252/20489* (2013.01); *B01D 2252/504* (2013.01); *B01D 2257/504* (2013.01); *C10L 2290/541* (2013.01)

(58) Field of Classification Search
CPC ............ B01D 53/1493; B01D 53/1475; B01D 2252/2025; B01D 2252/20405; B01D 2252/20426; B01D 2252/20447; B01D 2252/20489; B01D 2252/504; B01D 2257/504; B01D 2252/20; B01D 2252/202; B01D 2252/20478; C10L 3/104; C10L 2290/541; C10L 3/102
See application file for complete search history.

(56) References Cited

U.S. PATENT DOCUMENTS

| | | | | |
|---|---|---|---|---|
| 2013/0164200 A1 | | 6/2013 | Lail et al. | |
| 2017/0050140 A1 | | 2/2017 | Coleman et al. | |
| 2017/0225118 A1 | * | 8/2017 | Kim | B01D 53/1493 |
| 2019/0001259 A1 | * | 1/2019 | Matsuoka | B01D 53/52 |
| 2019/0352177 A1 | | 11/2019 | Denton et al. | |
| 2021/0178316 A1 | | 6/2021 | Lail et al. | |

FOREIGN PATENT DOCUMENTS

| | | | |
|---|---|---|---|
| CN | 104271219 | A | 1/2015 |
| CN | 105980033 | A | 9/2016 |
| JP | 2011230056 | A | 11/2011 |
| JP | 2011251220 | A | 12/2011 |
| KR | 20170072911 | A | 6/2017 |
| WO | 2018164705 | A1 | 9/2018 |

OTHER PUBLICATIONS

Rayer et al., "Absorption rates of carbon dioxide in amines in hydrophilic and hydrophobic solvents" Chemical Engineering Journal 348, Apr. 2018, 514-525 (Year: 2018).*
Lail et al., "Non-Aqueous Solvent (NAS) CO2 Capture Process" Energy Procedia 63, 2014, 580-594 (Year: 2014).*
Zhao et al., "Liquid-solid phase-change absorption of acidic gas by polyamine in nonaqueous organic solvent" Fuel 209, Jul. 2017, 69-75 (Year: 2017).*
Guo et al., "Nonaqueous amine-based absorbents for energy efficient CO2 capture" Applied Energy 239, Feb. 2019, 725-734 ( Year: 2019).*
Svensson et al., "Solubility of carbon dioxide in mixtures of 2-amino-2-methyl-1-propanol and organic solvents" International Journal of Greenhouse Gas Control 27, Jun. 2014, 247-254 (Year: 2014).*
ISA/KR; International Search Report and Written Opinion for International Patent Application No. PCT/US20/63892 dated Apr. 8, 2021, 11 pages.
CNIPA; Office Action for corresponding Chinese Patent Application No. 202080086035.5, mailed Jan. 9, 2024, 13 pages.

(Continued)

*Primary Examiner* — Anthony J Zimmer
*Assistant Examiner* — Abdul-Rahman Yusuf Waleed Smari
(74) *Attorney, Agent, or Firm* — Rimon P.C.; Allyn B. Elliott

(57) ABSTRACT

A non-aqueous solvent system configured to remove acidic gas from a gas stream comprises a solution formed of a chemical absorption component and a physical absorption component. The chemical absorption component includes a nitrogenous base, wherein the nitrogenous base has a structure such that it reacts with a portion of the acidic gas. The physical absorption component includes an organic diluent that is non-reactive with the acidic gas and that has a structure such that it absorbs a portion of the acidic gas at a pressure above atmospheric pressure. The solvent system has a solubility with water of less than about 10 g of solvent per 100 mL of water.

15 Claims, 10 Drawing Sheets

(56) References Cited

OTHER PUBLICATIONS

EPO; Extended European Search Report for corresponding European Patent Application No. 20899009.3, mailed Jan. 18, 2024, 8 pages.
Guo, H et al., "Nonaqueous amine-based absorbents for energy efficient CO2 capture", Applied Energy, Feb. 2019, vol. 239, pp. 725-734.
Wanderley, R. R. et al., "From hybrid solvents to water-lean solvents—A critical and historical review", Separation and Purification Technology, 2021, vol. 260, 118193, 28 pages.
Brazilian Intellectual Property Office: Technical Examination Report issued in corresponding Brazilian Patent Application No. BR112022011474-5, mailed Mar. 1, 2026, with English Translation, 22 pages.
Canadian Patent Office: Examination Report issued in corresponding Canadian Patent Application No. 3,160,221, mailed Jan. 28, 2026, 6 pages.
Ministry of Korean Intellectual Property: Notice to File a Response issued in corresponding Korean Patent Application No. 10-2022-7023618, mailed Feb. 4, 2026, 21 pages, with English Translation.

* cited by examiner

Breakdown of the Thermal Regeneration Energy Load

$$q_R = \left[\frac{C_P(T_R - T_F)}{\Delta\alpha} \cdot \frac{M_{sol}}{M_{CO_2}} \cdot \frac{1}{X_{sol}}\right] + \left[\Delta H_{v,H_2O} \cdot \frac{p_{H_2O}}{p_{CO_2}} \cdot \frac{1}{M_{CO_2}}\right] + \left[\frac{\Delta H_{abs,CO_2}}{M_{CO_2}}\right]$$

Reboiler Heat Duty | Sensible Heat | Heat of Vaporization | Heat of Absorption $Cp$ = [specific heat capacity of the solvent]

$T_R$ = Reboiler temperature $T_F$ = solvent feed temperature $M_{sol}$ = Molecular weight of the solvent $M_{CO2}$ = Molecular weight of carbon dioxide

FIG. 3

NON-AQUEOUS SOLVENT FOR REMOVING ACIDIC GAS FROM A PROCESS GAS STREAM FOR HIGH PRESSURE APPLICATIONS

CROSS-REFERENCE TO RELATED APPLICATIONS

This application is a U.S. National Stage application based on International Patent Application No. PCT/US20/63892, filed on Dec. 9, 2020, which claims the benefit of U.S. Provisional Patent Application No. 62/946,737, filed on Dec. 11, 2019, the entire contents of which are incorporated by reference herein.

BACKGROUND OF THE INVENTION

Field of Invention

The present invention relates to solvent systems for the removal of acidic gases from gas streams, as well as devices and methods using such systems. For example, the solvent systems can provide for removal of acidic gases, such as carbon dioxide ($CO_2$), carbonyl sulfide (COS), carbon disulfide ($CS_2$), sulfur oxides ($SO_x$) or a combination thereof, in high pressure applications.

Discussion of the Background

Separating or removing acidic gases from gas streams is an important step in various industrial processes. For example, acidic gases are removed from process streams in syngas and natural gas production. These gases often contain some level of acid gases contamination, be it from the source of natural gas or byproducts of upstream chemical reaction in synthesis gas production. These acid gases, such as $CO_2$, COS, $CS_2$, $H_2S$, $SO_x$, $NO_x$, HCl, etc., are removed from the product gases in order to meet required pipeline specifications, downstream gas purity needs, or to prevent catalyst poisoning in the downstream process.

In a typical solvent-based process, the process gas stream to be treated is passed through a liquid solvent that interacts with acidic compounds in the gas stream (e.g., $CO_2$ and $SO_2$) and separates them from non-acidic components. The solvent becomes rich in the acid-gas components, which are then removed under a different set of operating conditions so that the solvent can be recycled for additional acid-gas removal.

Generally, the separation process includes an absorber and desorber with solvent circulating to remove the acid gases. There are several commercially available solvents for such application which can be classified into aqueous (water-rich) and non-aqueous (water-lean) systems. Typically, aqueous systems use water as a dilution agent while containing 20-50 wt % of reactants for removing acid gas from the process gas stream while non-aqueous solvents contain minimal amounts of water and 10 to 60 wt % of active reactants for removing acid gas from the process gas stream.

The underlying removal mechanism of the solvent system can be classified as either physical or chemical absorption. Physical absorption utilizes pressure for the dissolution of acid gas molecules into the liquid solvent. The amount of acid gas dissolved in the physical solvent increases proportionally with increasing pressure. The acid gases are released from the gas-rich physical solvent when the pressure is reduced. That is, acid gas can be released by flashing the gas from a gas-rich solvent at a lower pressure. The energy needed for releasing the acid gas from the physical solvent and recovering the solvent for reuse is relatively low. However, a physical solvent typically does not perform well for deep removal (that is, removal of a high concentration of acid gas, for example, greater than 90 wt % or greater than 95 wt %) or under low concentration of acid gas due to solubility limitations at low partial pressures.

Chemical absorption involves a reaction of acid gas species with a chemical absorption solvent to form chemical bonds between the acid gases and the solvent. The absorption, which is exothermic in nature, occurs very rapidly and is capable of deep removal of acid gas, as long as the solvent contains adequate reactant to react with the acid gas up to its reaction limit. The reaction limit is usually determined by the stoichiometric ratio of the chemical absorption solvent and acid gas species. This stoichiometric ratio can also be used to determine how much chemical absorption solvent is needed to remove the acid gas contaminants per unit volume.

Reversal of the chemical absorption reaction generally requires at least the amount of energy to be added back to the rich solvent that was produced by the forward reaction, not to mention the energy needed to bring the gas-rich chemical absorbent solvent to the temperature at which reversal is appreciable and to maintain conditions to complete the reverse reaction to an appreciable extent. As such, chemical absorption solvents require a relatively high amount of energy to dissociate the chemical bonds between the solvent and the acidic gases. Energy usage for chemical absorption in aqueous solvent systems increases even more since more energy is used to heat up and evaporate excess water in the aqueous system.

Most of the solvents available commercially are either physical or chemical aqueous solvents. Aqueous solvents are widely used for a number of acid gas removal applications. However, use of aqueous solvents has disadvantages, including, without limitation, high corrosion rates, high energy requirements for solvent regeneration, and a large process footprint, all of which lead to high capital costs.

Given the foregoing, it is desirable to provide a solvent system for acid gas removal applications that could reduce capital as well as the operating costs.

SUMMARY OF THE INVENTION

In a first aspect of the invention, a non-aqueous solvent system configured to remove acidic gas from a gas stream includes a solution formed of a chemical absorption component that includes a nitrogenous base, wherein the nitrogenous base has a structure such that it reacts with a portion of the acidic gas; and a physical absorption component including an organic diluent that is non-reactive with the acidic gas and that has a structure such that it absorbs a portion of the acidic gas at a pressure above atmospheric pressure. The solvent system has a solubility with water of less than about 10 g of solvent per 100 mL of water.

In a feature of the first aspect, the nitrogenous base may comprise 1,4-diazabicyclo-undec-7-ene ("DBU"); 1,4-diazabicyclo-2,2,2-octane; piperazine ("PZ"); triethylamine ("TEA"); 1,1,3,3-tetramethyl guanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethyl amine; 3,5-difluorobenzylamine; N-methylbenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; or mixtures thereof. The organic diluent may be selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof.

In another feature of the first aspect, the chemical absorption component may be present in a concentration ranging from 1 to 50 wt % relative to the total system. Moreover, the physical absorption component may be present in a concentration ranging from 40 to 95 wt % relative to the total system. The system may further comprise water.

In a second aspect of the invention, a method of removing acidic gas from a gas stream includes introducing a non-aqueous solvent system comprising a physical absorption component and a chemical absorption component to an absorber vessel, which is operating at a pressure above atmospheric pressure, and introducing a gas stream comprising acidic gas to the absorber vessel such that the gas stream is brought into fluid contact with and passed through the non-aqueous solvent system whereby acidic gas is removed from the gas stream by the solvent system.

In a third aspect of the invention, a method for reducing the amount of energy required for solvent regeneration of a non-aqueous solvent system (NASS) in an acidic gas scrubbing process, relative to the amount of energy required for solvent regeneration of a conventional aqueous solvent, includes using a NASS as described above to remove acidic gas from a process stream in an absorber vessel being operated at a pressure above atmospheric pressure and at or below 60 bar, thereby forming an acid gas-containing NASS. The method also includes introducing the acid gas-containing NASS to a pressure relief vessel, wherein the pressure relief vessel is being operated at a temperature and a pressure and wherein the pressure relief vessel operating pressure is less than the absorber vessel operating pressure, whereby the acidic gas absorbed by the physical absorption component of the NASS is released from the acidic gas-containing NASS upon introduction to the pressure relief vessel and whereby the pressure relief vessel operating temperature is such that the acidic gas absorbed by the chemical absorption component of the acidic gas-containing NASS is released from the acidic gas-containing NASS thereby providing regenerated NASS that is essentially free of acidic-gas and which can be reused in the gas scrubbing process. With the described method, the energy used to provide regenerated NASS is reduced relative to the energy used to provide a regenerated form of an aqueous solvent in an acidic gas scrubbing process.

It is to be understood that both the foregoing general description of the invention and the following detailed description are exemplary, but are not restrictive of the invention.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 3 is an illustration of an exemplary calculation to determine reboiler heat duty for the chemical absorption component of solvent system.

DETAILED DESCRIPTION OF THE INVENTION

Figure 1:
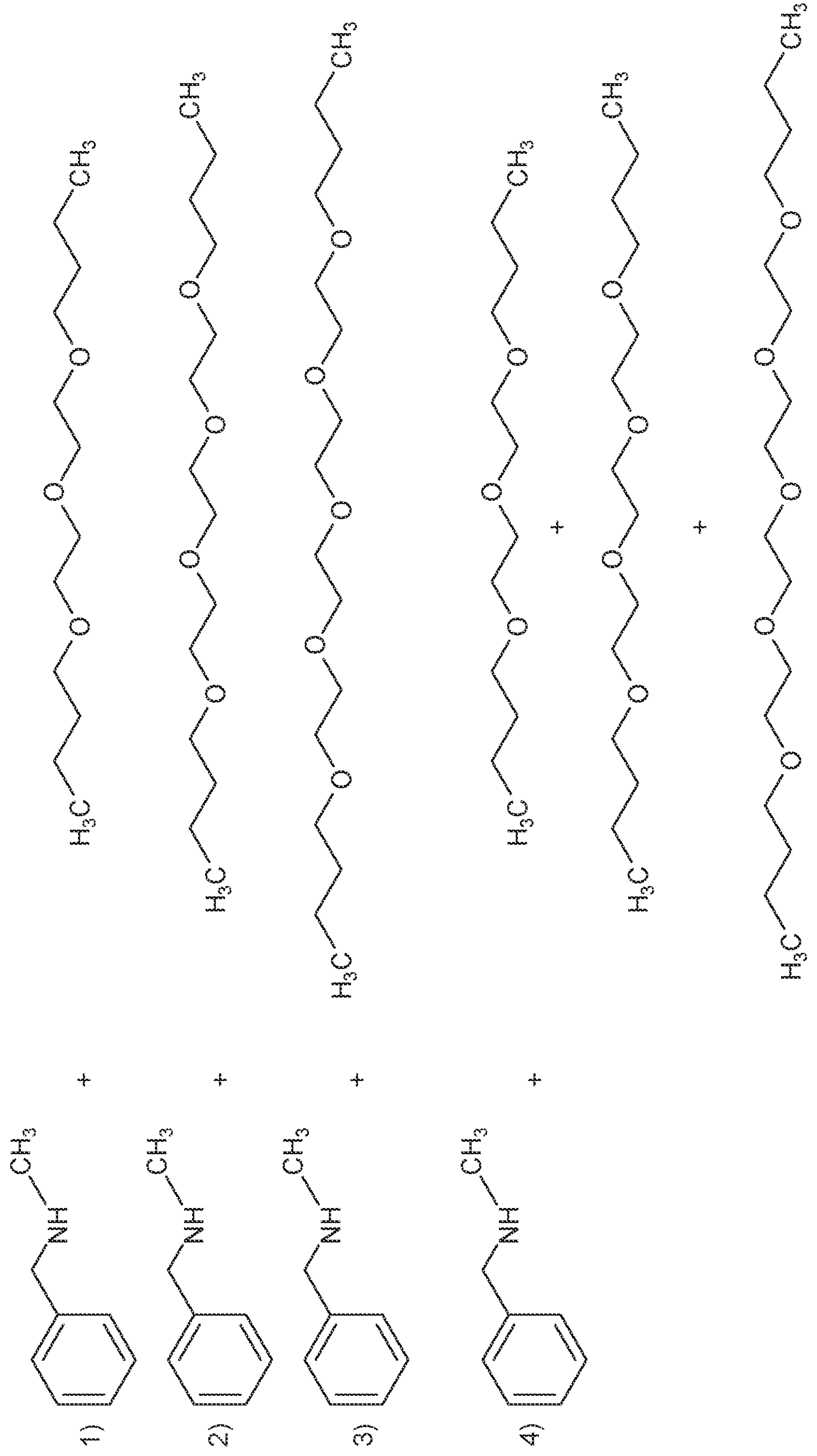
FIG. 1 is a schematic representation of components of exemplary solvent systems.

Described herein is a non-aqueous solvent system configured to remove acidic gas from a gas stream. The term "acid gas" or "acidic gas" is intended to refer to any gas component that can result in formation of an acid when mixed with water. Non-limiting examples of acid gases encompassed by the present invention include $CO_2$, $SO_2$, COS, $CS_2$ and $NO_x$. For simplicity, the invention is described below in relation specifically to $CO_2$. It is understood, however, that the present invention encompasses methods and systems for removal of any acid gas component from a gas stream.

In certain embodiments, the solvent system is regenerable in that the acidic gases can be released from the solvent, and the solvent can be reused to separate additional acidic gases from further gas mixtures.

The solvent system includes a solution formed of a chemical absorption component and a physical absorption component. The chemical absorption component comprises a nitrogenous base, and the nitrogenous base has a structure such that it reacts with a portion of the acidic gas. The physical absorption component comprises an organic diluent that is non-reactive with the acidic gas and that has a structure such that it absorbs a portion of the acidic gas at a pressure above atmospheric pressure.

The organic diluent can be, but is not necessarily, a relatively acidic component. The term "relatively acidic component" as used herein is interchangeable with the term "acidic component" and is understood to mean a material having an acidity that is greater than the acidity of water, preferably substantially greater than the acidity of water. For example, in some embodiments, the diluent can have a pKa of less than about 15, less than about 14, less than about 13, less than about 12, less than about 11, or less than about 10. In other embodiments, the organic diluent is not a relatively acidic component, and does not have a pKa that falls within the ranges noted above. For example, the organic diluent may, in certain embodiments, have a pKa greater than about 15.

In certain embodiments, the organic diluent used in the solvent system may be generally selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof. In more specific embodiments, the diluent may be selected from polyethylene glycol dialkyl ethers. For example, the diluent may be selected from polyglycol dimethyl ethers and polyglycol dibutyl ethers, such as, for example, di-ethylene glycol di-butyl ether, tri-ethylene glycol di-butyl ether, tetra-ethylene glycol di-butyl ether, or a combination thereof. In embodiments, the diluent generally has a low vapor pressure and low viscosity. The removal of acid gases using the diluent or physical absorption component is achieved through direct contact between the acid gas and the diluent.

The nitrogenous base can be characterized as any nitrogenous base having a proton that can be donated from a nitrogen, which reacts with an acid gas via a carbamate pathway and avoids reaction with the acid gas to form carbonate esters. The nitrogenous base component may, in certain embodiments, be almost any nitrogenous base that meets this requirement including, but not limited to, primary amines, secondary amines, diamines, triamines, tetraamines, pentamines, cyclic amines, cyclic diamines, amine oligomers, polyamines, alcoholamines, guanidines, amidines, and the like. In some embodiments, the nitrogenous base can have a pKa of about 8 to about 15, about 8 to about 14, about 8 to about 13, about 8 to about 12, about 8 to about 11, or about 8 to about 10. In certain embodiments, the nitrogenous base component has a pKa less than about 11.

A primary amine is understood to be a compound of the formula $NH_2R$, where R can be a carbon-containing group, including but not limited to $C_1$-$C_{20}$ alkyl. A secondary amine is understood to be a compound of the formula $NHR_1R_2$, wherein $R_1$ and $R_2$ are independently carbon-containing groups, including but not limited to $C_1$-$C_{20}$ alkyl, wherein R, $R_1$, and $R_2$ are independently carbon-containing groups, including but not limited to $C_1$-$C_{20}$ alkyl. One or more of the hydrogens on R, $R_1$, and $R_2$ may optionally be replaced with one or more substituents. For example, one or more of the hydrogens on R, $R_1$, or $R_2$ may be replaced with optionally substituted $C_1$-$C_6$ alkyl, optionally substituted $C_1$-$C_6$ alkoxy, optionally substituted $C_2$-$C_{10}$ alkenyl; optionally substituted $C_2$-$C_{10}$ alkynyl; optionally substituted alkaryl; optionally substituted arylalkyl; optionally substituted aryloxy; optionally substituted heteroaryl; optionally substituted heterocycle; halo (e.g., $C_1$, F, Br, and I); hydroxyl; halogenated alkyl (e.g., $CF_3$, 2-Br-ethyl, $CH_2F$, $CH_2CF_3$, and $CF_2CF_3$); optionally substituted amino; optionally substituted alkylamino; optionally substituted arylamino; optionally substituted acyl; CN; $NO_2$; $N_3$; $CH_2OH$; $CONH_2$; $C_1$-$C_3$ alkylthio; sulfate; sulfonic acid; sulfonate esters (e.g., methanesulfonyl); phosphonic acid; phosphate; phosphonate; mono-, di-, or triphosphate esters; trityl or monomethoxytrityl; $CF_3S$; $CF_3SO_2$; or silyl (e.g., trimethylsilyl, dimethyl-t-butylsilyl, and diphenylmethylsilyl). Cyclic amines are amines wherein the nitrogen atom forms part of the ring structure, and may include, but are not limited to, aziridines, azetidines, pyrrolidines, piperidines, piperazines, pyridines, pyrimidines, amidines, pyrazoles, and imidazoles. Cyclic amines may comprise one or more rings and may optionally be substituted with one or more substituents as listed above. In some embodiments, the nitrogenous base has a guanidine structure, which is optionally substituted with one or more substituents as noted above. In some embodiments, the nitrogenous base has an amidine structure, which is optionally substituted with one or more substituents as noted above. In some embodiments, the nitrogenous base may be a diamine. In some embodiments, the nitrogenous base may be a primary or secondary alcoholamine. Alcoholamines are also known as amino alcohols and contain both an alcohol and amine group. The amine group of the alcoholamine may be any type of amine as disclosed herein. In some embodiments, the alcoholamine is a primary, secondary, or tertiary alcohol amine.

In certain embodiments, the primary or secondary amine may be selected from amines functionalized with fluorine-containing-alkyl-aromatic groups. In specific embodiments, the amine may be selected from the group consisting of 2-fluorophenethylamine, 3-fluorophenethylamine, 4-fluorophenethylamine, 2-fluoro-N-methylbenzylamine, 3-fluoro-N-methylbenzylamine, and 4-fluoro-N-methylbenzylamine, 3,5-di-fluorobenzylamine, D-4-fluoro-alpha-methylbenzylamine, and L-4-fluoro-alpha-methylbenzylamine.

In certain embodiments, the nitrogenous base may be selected from the group consisting of 1,4-diazabicyclo-undec-7-ene ("DBU"); 1,4-diazabicyclo-2,2,2-octane; piperazine ("PZ"); triethylamine ("TEA"); 1,1,3,3-tetramethyl guanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethyl amine; 3,5-difluorobenzylamine; N-methylbenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; and mixtures thereof. In certain embodiments, the nitrogenous base may be a guanidine or amidine. In embodiments, the nitrogenous base may be N-methylbenzylamine.

Certain specific solvent systems are illustrated in FIG. 1. As shown in FIG. 1, in the solvent system, the nitrogenous base can be N-methylbenzylamine, and the organic diluent can be one or a combination of di-ethylene glycol di-butyl ether, tri-ethylene glycol di-butyl ether, or tetra-ethylene glycol di-butyl ether.

In some embodiments, the solvent system may include a mixture comprising a nitrogenous base and a diluent, which components may be present in roughly equal proportions by molarity (i.e. are present in equimolar amounts). In certain embodiments, the diluent is present in excess. For example, the molar ratio of diluent to nitrogenous base can be about 1:1 to about 100:1, for example, about 1.1:1 to about 20:1, 1.1:1 to about 15:1, 1.1:1 to about 10:1, 1.1:1 to about 5:1, 1.1:1 to about 3:1, about 2:1 to about 20:1, about 2:1 to about 15:1, 2:1 to about 10:1, 2:1 to about 5:1, about 3:1 to about 20:1, about 3:1 to about 15:1, about 3:1 to about 10:1, about 4:1 to about 20:1, about 4:1 to about 15:1, about 4:1 to about 10:1, about 5:1 to about 20:1, about 5:1 to about 15:1, or about 5:1 to about 10:1.

In embodiments, the solvent system may include a mixture comprising a chemical absorption component and a physical absorption component, which components may be present in roughly equal proportions by weight percent. In certain embodiments, the physical absorption component is present in excess. For example, the chemical absorption component may be present in a concentration ranging from about 1 to about 50 wt % relative to the total system weight, for example, from about 5 to about 30 wt % of the total system, from about 10 to about 20 wt %, or from about 10 to about 15 wt % of the total system. In embodiments, the physical absorption component may be present in a concentration ranging from about 40 to about 95 wt % relative to the total system, for example, from about 50 to about 90 wt % of the total system, from about 70 to about 90 wt % of the total system. In embodiments, the solvent system may further include water. The water may be present in a concentration ranging from about 1 to about 10 wt % of the total system. In an exemplary embodiment, the components may be present in the following concentrations: about 1 to 20 wt % chemical absorption component, about 70 to 98 wt % physical absorption component, and about 1 to 10 wt % water.

In embodiments, the solvent system can be formulated with a combination of a hydrophobic amine species that chemically reacts with $CO_2$ and a hydrophobic organic solvent that physically absorbs $CO_2$. The solvent system can perform at similar or better capacity and be competitive with commercially available acid gas scrubbing solvents. In embodiments, the solvent system can be used for $CO_2$ removal from a synthesis gas stream. The solvent system can be a good candidate to replace the commercially available aqueous-amine based acid removal solvents, such as for example, activated methyldiethanolamine (aMDEA).

As will be described in the example section below, exemplary embodiments of the solvent system are capable of performing deep $CO_2$ removal similar to commercially available aMDEA while reducing the amount of energy needed for solvent regeneration. In exemplary embodiments, N-Methylbenzylamine (NMBA) can be used as the nitrogenous base to chemically bind $CO_2$ and an organic diluent comprising polyethyleneglycol di-butylether can be used to physically absorb the $CO_2$ at elevated pressure. To release the physisorbed portion of $CO_2$, a simple flash tank is sufficient, which requires little energy.

Although not wishing to be bound by theory, it is believed that the use of an additional component can be useful to reduce or prevent precipitation of solids in the solvent system. In some embodiments, the solvent system may further comprise one or more additional components. The additional components may be added, for example, to increase the solubility of the captured $CO_2$ product in the solvent system, and thus avoid the formation of precipitates. In other embodiments, however, solids formation may be desirable, and such formation may be enhanced by altering the concentration of one or more solvent system components.

In some embodiments, the solvent system is useful for capturing $CO_2$ from a gas stream. In additional embodiments, the solvent system is useful for capturing $CO_2$ from a gas stream at a pressure above atmospheric pressure. For example, the operating pressure of the absorber vessel may be from about 2 bar to about 60 bar.

The gas stream may be a mixed gas stream, having one or more other components in addition to $CO_2$. When the solvent system is contacted with a gas mixture containing $CO_2$, the chemical absorption component of the solvent system undergo a chemical reaction with $CO_2$, binding the $CO_2$ in the solution. The physical absorption component of the solvent system utilizes pressure for the dissolution of $CO_2$. The amount of acid gas dissolved in the physical absorption solvent increases proportionally with increasing pressure.

In some embodiments, the solvent systems have high $CO_2$ removal. For example, the solvent systems may be useful for capturing or removing greater than about 80 wt % of the $CO_2$ present in the process gas stream. For example, the solvent systems may capture or remove greater than about 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or up to 100 wt % of the $CO_2$ present in the process gas stream. As used herein, the term "deep removal" means capture or removal of $CO_2$ greater than about 90 wt %, 91 wt %, 92 wt %, 93 wt %, 94 wt %, 95 wt %, 96 wt %, 97 wt %, 98 wt %, 99 wt %, or up to 100 wt % of the $CO_2$ present in the process gas stream. The term deep removal is also applicable for acid gases other than $CO_2$. In embodiments, the solvent systems may be useful for capturing or removing close to or substantially all of the $CO_2$ present in the process gas stream. For example, after having contacted the solvent system, the gas stream from which the $CO_2$ has been captured or removed (the "lean gas stream") may have $CO_2$ present in amounts of less than or equal to about 1500 ppm. For example, $CO_2$ may be present in the lean gas stream in amounts from about 500 ppm to about 1500 ppm. In embodiments, $CO_2$ may be present in the lean gas stream in amounts of less than or equal to about 500 ppm, 600 ppm, 700 ppm, 800 ppm, 900 ppm, 1000 ppm, 1100 ppm, 1200 ppm, 1300 ppm, 1400 ppm, or 1500 ppm.

In some embodiments, the solvent systems can be used for partial $CO_2$ removal. For example, the solvent systems may be useful for capturing or removing from about 30 wt % to about 70 wt % of the $CO_2$ present in the process gas stream. For example, the solvent systems may capture or remove about 30 wt %, 35 wt %, 40 wt %, 45 wt %, 50 wt %, 55 wt %, 60 wt %, 65 wt %, or 70 wt % of the $CO_2$ present in the process gas stream.

In certain embodiments, the diluent (i.e., the physical absorption component) is selected such that it has low miscibility with water. For example, in some embodiments, the diluent has a solubility of less than or equal to about 10 g/100 mL in water at 25° C. (i.e., 10 g of solvent per 100 mL of water). In other embodiments, the diluent has a solubility in water of less than or equal to about 0.01 g/100 mL, less than or equal to about 0.1 g/100 mL, less than or equal to about 0.5 g/100 mL, less than or equal to about 1 g/100 mL, less than or equal to about 1.5 g/100 mL, less than or equal to about 2 g/100 mL, less than or equal to about 2.5 g/100 mL, less than or equal to about 3 g/100 mL, less than or equal to about 4 g/100 mL, less than or equal to about 5 g/100 mL, less than or equal to about 6 g/100 mL, less than or equal to about 7 g/100 mL, less than or equal to about 8 g/100 mL, or less than or equal to about 9 g/100 mL in water at 25° C. In some embodiments, the diluent is completely immiscible with water. Using diluents with low water solubility may result in solvent systems that display one or more of the following attributes: they may require less energy for regeneration; may have high $CO_2$ removal capacities; may be able to tolerate water in the gas stream; and/or may be able to be separated from water without a large energy penalty.

In additional embodiments, the nitrogenous based component of the solvent system (i.e., the chemical absorption component) is similarly selected such that it has low miscibility with water. In preferred embodiments, the nitrogenous base has higher miscibility with the diluent than with water. In some embodiments, the nitrogenous base has high solubility in the diluent. Examples of such nitrogenous bases include, but are not limited to, aliphatic amines with one or more hydrocarbon chains composed of three or more carbons, and aliphatic amines with one or more hydrocarbon chains composed of three or more carbons with one or more fluorine atoms substituted for hydrogen in the hydrocarbon chain. It is noted that although diluents and/or nitrogenous bases having low miscibility with water are preferred, the present invention also encompasses solvent systems wherein the diluents, nitrogenous base, and/or combination thereof are at least partially miscible with water.

In embodiments, the solvent system has a dynamic viscosity ranging from 1 mPas to 20 mPas at a temperature of 10 to 60° C. For example, the dynamic viscosity may be from about 1 mPas to about 10 mPas, from about 1 mPas to about 8 mPas, or from about 1 mPas to about 4 mPas. In embodiments, the solvent system has a vapor pressure ranging from about 0.02 mbar to about 0.03 mbar at 20° C.

In some embodiments, the solvent system is tolerant to the presence of water. In certain embodiments, the solvent system tolerates water up to or equal to about 30% water by volume. For example, in some embodiments, the solvent system tolerates up to or equal to about 25% water by volume, up to or equal to about 20%, up to or equal to about 15%, up to or equal to about 10%, up to or equal to about 5%, up to or equal to about 2%, or up to or equal to about 1% water by volume. In some embodiments, tolerance to the presence of water means that there is little to no degradation of the solvent system performance up to the indicated volume of water. In some embodiments, the solvent system maintains at or near its initial capacity for $CO_2$ removal up to the indicated volume of water.

In embodiments, the $CO_2$ captured using the solvent system of the present invention may be released to regenerate the solvent system for reuse. It is desirable that the solvent system is regenerable under mild conditions (e.g., at a relatively low temperature and pressure). In some embodiments, the release of $CO_2$ and corresponding regeneration of the solvent system is effectuated by reducing the pressure of and heating the solution. When the pressure is reduced, the physically-absorbed $CO_2$ is released from the physical absorption component of the solvent system. When the solution containing chemically bound $CO_2$ is heated, the chemical reaction with the chemical absorption component is reversed and the chemically-bound $CO_2$ is released. The released $CO_2$ provides a concentrated $CO_2$ stream.

In some embodiments, the present application relates to a solvent system and process for the removal of $CO_2$ from a gas stream. The process applies to any gas stream containing $CO_2$. For example, in particular embodiments, the process relates to the removal of $CO_2$ from fossil fuel combustion flue gas, a natural gas mixture, or a mixture of respiration gases from closed environments containing $CO_2$. The process involves passing the mixed gas stream through a solvent system comprising a diluent and a nitrogenous base component. In some embodiments, the process further relates to the regeneration of the solvent system, which releases the $CO_2$. In some embodiments, regeneration of the solvent system involves heating the solvent system at a temperature sufficient to release the $CO_2$. In some embodiments, the process involves heating the solvent system at a temperature at or below about 200° C., for example, at or below about 185° C. C, at or below about 150° C., or at or below about 125° C. In preferred embodiments, the process involves heating the solvent system at a temperature at or below about 100° C., for example, at a temperature at or below about 95° C., at or below about 90° C., at or below about 85° C., at or below about 80° C., at or below about 75° C., or at or below about 70° C. In some embodiments, the $CO_2$ may be released at ambient temperature.

In some embodiments, regeneration of the solvent system involves reducing the pressure of the solvent system to release the $CO_2$ absorbed at a relatively higher pressure. In some embodiments, the process involves reducing the pressure of the solvent system at or below about 60 bar, for example, at or below about 40 bar, at or below about 20 bar, or at or below about 5 bar. In certain embodiments, the pressure is reduced to atmospheric pressure. In certain embodiments, the $CO_2$ is captured in a non-aqueous phase under conditions in which water accumulates as a separate, lower density phase. This phase can be sent to the regenerator with the rich, non-aqueous phase to be regenerated at a lower temperature than the corresponding rich aqueous phase alone. This can be followed by phase separation from the lean, regenerated solvent before being sent back to the absorber.

In some embodiments, the present application relates to a method of deep removal of acidic gas from a gas stream. The method includes introducing a non-aqueous solvent system comprising a physical absorption component and a chemical absorption component to an absorber vessel, which is operating at a pressure above atmospheric pressure. The method further includes introducing a gas stream comprising acidic gas to the absorber vessel such that the gas stream is brought into fluid contact with and passed through the non-aqueous solvent system whereby at least 90 wt % of the acidic gas is removed from the gas stream by the solvent system. In embodiments, the absorber vessel is operating at a pressure of about 2 to 60 bar. For example, the pressure may be about 10 to 30 bar. In embodiments, at least 95 wt % of the acidic gas is removed from the gas stream. For example, at least, 97 wt %, at least 98 wt %, or at least 99 wt % of the acidic gas is removed from the gas stream. In some embodiments, the gas stream has an initial concentration of acidic gas when it is introduced to the absorber vessel and a reduced concentration of acidic gas after having passed through the absorber vessel and the reduced concentration of acidic gas is from about 750 ppm to 1500 ppm. The reduced concentration of acidic gas can be less than or equal to 1500 ppm.

In certain embodiments, when the solvent system is regenerated, at or about 100% of the $CO_2$ is removed from the $CO_2$-rich solvent system. However, in other embodiments, less than 100% of the $CO_2$ is removed from the $CO_2$-rich solvent system. In embodiments, about 50 to 100% of the captured $CO_2$ is removed from the $CO_2$-rich solvent system, for example, about 75% to 100%, about 80% to 100%, about 90% to 100%, about 95% to about 100%, or about 98% to 100%. For example, in some embodiments, at least about 98%, 95%, 90%, 85%, 80%, 75%, 70%, 60%, or 50% of the captured $CO_2$ is removed from the $CO_2$-rich solvent system.

Figure 2:
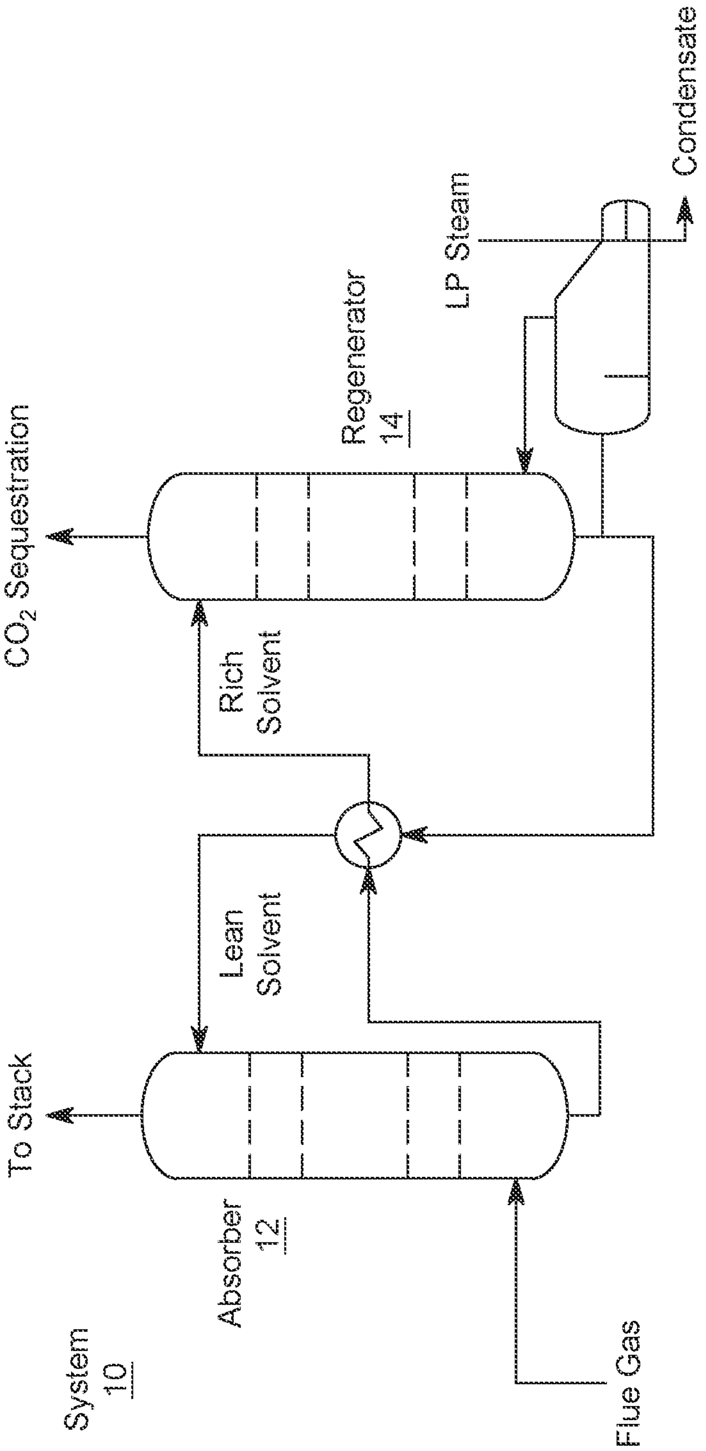
FIG. 2 is a schematic flow diagram of an exemplary system for removal of $CO_2$ from a gas stream.

In some embodiments, a system for the removal of $CO_2$ from a gas stream is provided. A schematic of an exemplary system of the present invention is depicted in FIG. 2. The $CO_2$ removal system 10 includes an absorber 12 configured with an inlet to receive a gas stream. The gas stream may come directly from, e.g., a combustion chamber of a boiler system in a power generation plant. The gas stream may or may not be passed through other cleaning systems prior to entering the $CO_2$ removal system. The absorber may be any chamber wherein a solvent system for the removal of $CO_2$ is contained, having an inlet and outlet for a gas stream, and wherein the gas stream may be brought into contact with the solvent system. Within the absorber, the $CO_2$ may be transferred from gaseous phase to liquid phase according to the principles discussed herein. The absorber may be of any type; for example, the absorber may comprise a spray-tower absorber, packed-bed absorber (including countercurrent-flow tower or cross-flow tower), tray-tower absorber (having various tray types, including bubble-cap trays, sieve trays, impingement trays, and/or float valve trays), venture absorber, or ejector absorber.

The temperature and pressure within the absorber may be controlled. For example, in one embodiment, the temperature of the absorber may be maintained at or near −10° C. to about 60° C. For example, the temperature of the absorber may be about 0° C. to about 60° C., about 30° C. to about 60° C., or about 50° C. to about 60° C. In embodiments the pressure of the absorber is maintained at a pressure above atmospheric pressure. For example, the pressure of the absorber may be maintained at a pressure of about 5 bar to about 60 bar, about 10 bar to about 60 bar, about 30 bar to about 60 bar, about 10 bar to about 30 bar, about 5 bar to about 20 bar, or about 10 bar to about 20 bar. In embodiments, the absorber may be maintained at or near atmospheric pressure. Thus, the absorber may be equipped with a heating/cooling system and/or pressure/vacuum system.

Within the absorber, the gas stream is brought into fluid contact with and passed through a solvent system comprising a diluent and a nitrogenous base component. The solvent system interacts with the $CO_2$ present in the gas stream through chemical and physical absorption, capturing it from the remaining components of the gas. The resulting $CO_2$-free gas stream is released from the absorber through an outlet. The solvent system continues to interact with $CO_2$ entering the absorber as the mixed gas stream is passed through, until it becomes "rich" with $CO_2$. The absorber is optionally connected to one or more processing units. For example, the absorber may be configured with a means for routing the solvent system to a unit wherein water may be decanted, centrifuged, or otherwise removed from the system. In embodiments, the solvent system may absorb more than one type of acid gas from the gas stream. For example, the solvent system may absorb $CO_2$ and sulfur species acid gases. In this exemplary embodiment, the absorber may be connected to one or more processing units that can separate the $CO_2$ and the sulfur species acid gases into two streams to achieve a high purity (>90 wt %) $CO_2$ stream and a stream with greater than 50% purity of the sulfur species.

At any stage in the process of $CO_2$ capture, the solvent system may be regenerated. The system therefore includes an optional regeneration system 14 to release the captured $CO_2$ via a separate $CO_2$ gas stream and thus regenerate the solvent system. The regeneration system is configured to receive a feed of "rich" solvent from the absorber and to return regenerated solvent to the absorber once $CO_2$ has been separated from the "rich" solvent. The regeneration system may simply comprise a chamber operated at a lower pressure than the absorber and having a heating unit to heat the solvent system to a temperature sufficient to release the $CO_2$ gas, along with a release valve to allow the $CO_2$ to be removed from the regeneration system. It may also be a distillation column operated at a pressure lower than the absorber and have essentially the same design as described above for the absorption column. The regenerator may be optionally connected to one or more units. For example, the regenerator may be configured with a means for routing solvent to a unit wherein water may be decanted, centrifuged, or otherwise removed from the system.

The released $CO_2$ can be output to storage or for other predetermined uses. The regenerated solvent is again ready to absorb $CO_2$ from a gas stream, and may be directed back into the absorber.

In some embodiments, the present application relates to a method for reducing the amount of energy required for solvent regeneration of a non-aqueous solvent system (NASS) in an acidic gas scrubbing process. The regeneration energy savings is relative to the amount of energy required for solvent regeneration of a conventional aqueous amine-based solvent. The solvent system described herein can be used to remove acidic gas from a gas stream in an absorber vessel operated at a pressure above atmospheric pressure and at or below 60 bar, thereby forming an acid gas-containing NASS. The acid gas-containing NASS can be introduced to a pressure relief vessel, which is being operated at a pressure less than the absorber vessel operating pressure. The reduction in pressure leads to the acidic gas absorbed by the physical absorption component of the NASS being released from the acidic gas-containing NASS. The pressure relief vessel is heated to a temperature such that the acidic gas absorbed by the chemical absorption component of the acidic gas-containing NASS is released thereby providing regenerated NASS that can be reused in the gas scrubbing process. The energy used to provide regenerated NASS is reduced relative to the energy used to provide a regenerated form of an aqueous solvent in an acidic gas scrubbing process. In embodiments, a percentage of acid gas absorbed by the physical absorption component of the NASS is greater than a percentage of acid gas absorbed by the chemical absorption component of the NASS. For example, the ratio of acid gas absorbed by the physical absorption component relative to the acid gas absorbed by the chemical absorption component is in a range of 1.5:1 to 30:1. For example, the ratio may be 2:1, 3:1, 4:1, 5:1, 6:1, 7:1, 8:1, 9:1, or 10:1.

Calculations can be performed to estimate the amount of energy savings that can be achieved during solvent regeneration by using the solvent system described herein in comparison to commercially available aqueous amine-based systems. FIG. 3 provides an illustration of an exemplary calculation to determine reboiler heat duty for the chemical absorption component of solvent system. The calculation includes the sensible heat required to heat the solvent to the regeneration temperature, the heat of vaporization that is required to remove the absorbed acid gas from the physical absorption component and the heat of absorption that is required to remove the absorbed acid gas from the chemical absorption component. As will be explained in the example section below, the heat of absorption for the chemical absorption component significantly affects the reboiler heat duty.

The solvent system described herein provides advantages over existing acid gas scrubbing solvents. In embodiments, the regeneration energy needed to release captured $CO_2$ is reduced relative to commercially available aqueous absorption solvents. Moreover, in embodiments, the relatively low viscosity of the solvent system enables savings on pumping costs compared to commercially available higher viscosity solvents, such as, for example, aMDEA. Further, in embodiments, the solvent system has a high working capacity at relatively low temperatures, thus enabling a reduced process footprint, reduced operating costs and minimized solvent emissions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

EXAMPLES

Example 1—Evaluating $CO_2$ Removal Efficiency

Figure 4:
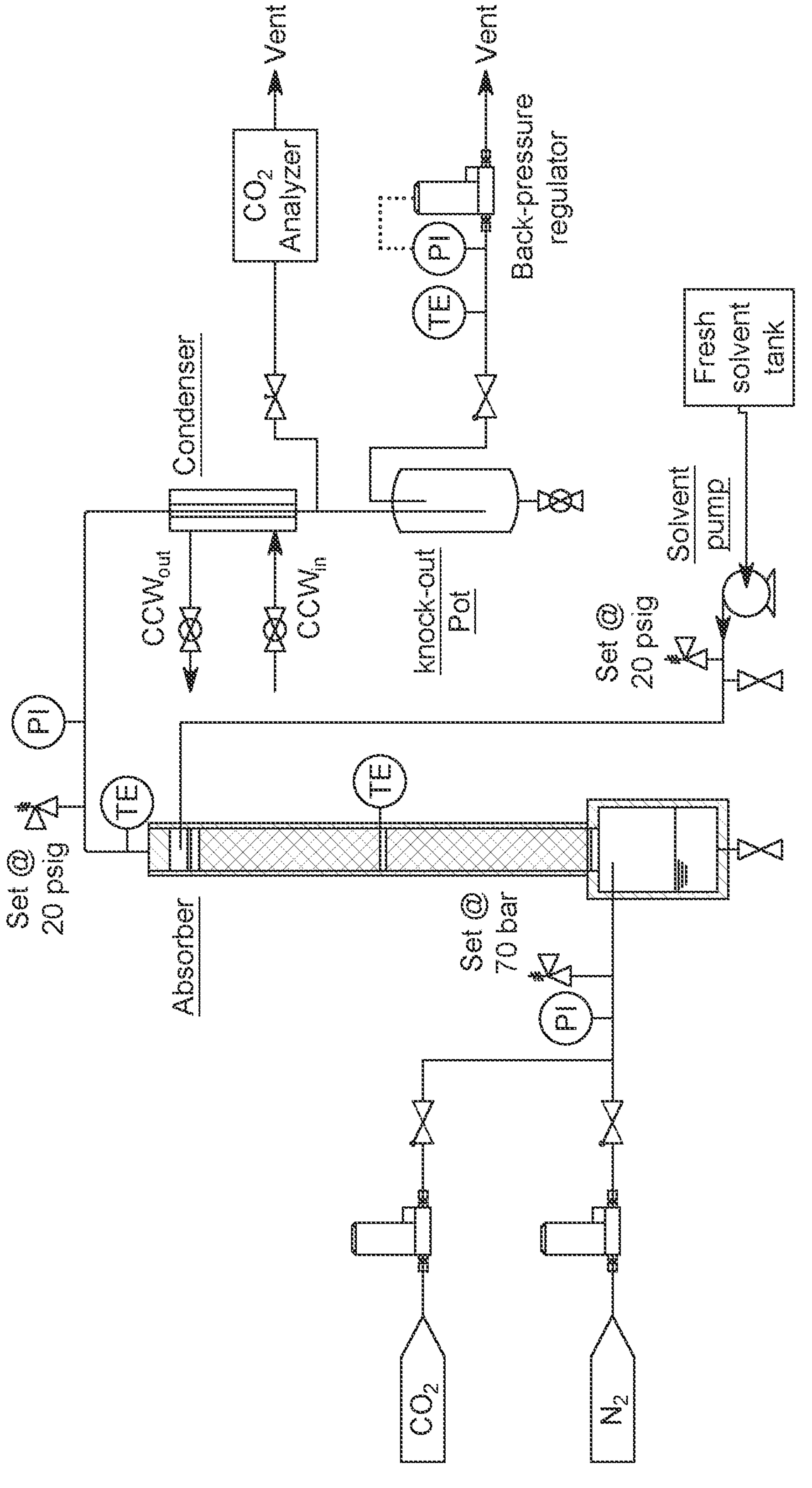
FIG. 4 is a schematic flow diagram of the absorber column used for testing.

The $CO_2$ removal efficiency of an exemplary embodiment of the solvent system was compared to the same for a solvent with composition similar to commercially available aMDEA® (aqueous alkaline amine solution produced and marketed by BASF, Ludwigshafen, Germany) using a single-pass, gas-liquid contact high pressure absorber column. FIG. 4 provides a schematic of the absorber column used for testing. $N_2$ and $CO_2$ mass flow controllers were used to control the composition of the gas that entered the bottom of absorber column. The absorber column was constructed using 1 in. OD SS pipe attached with a 4 L SS sump at the bottom of the column and insulated with ceramic fiber insulation. The absorption column was packed with approximately 300 grams of 0.16 in. Pro-Pak® protruded random metal packing with a packing height of 3.5 m. Solvent was metered and delivered at the top of the absorber by a diaphragm pump. The solvent and $CO_2$ containing gas contacted one another in the absorber column and the $CO_2$-rich liquid solvent was collected in the absorber sump while the $CO_2$-free gas exited from the top of the column. The absorber off-gas was cooled using a condenser to remove the carry-over solvent where it was collected by the knock-out pot. A slipstream of the dry, solvent-free gas stream was extracted and fed to a $CO_2$ analyzer before the knock-out pot to reduce the response lag-time created by the vessel. The remaining gas exited the system through a back-pressure regulator at the outlet of the knock-out pot to maintain a constant pressure in the column. Pressure relief valves were installed throughout at gas feed locations to prevent over-pressurizing the system. Temperature and pressure at different locations were monitored via temperature probes (TE) and pressure indicators (PI), respectively.

The exemplary solvent system used in the testing was a blend of N-Methylbenzylamine (NMBA) with polyglycol dibutyl ether and water having the following concentrations: about 10.5 wt % NMBA, about 5.2 wt % water and balance polyglycol dibutyl ether. Since the composition of aMDEA® is proprietary and not publicly available, a blend of 62.6 wt % MDEA, 5.37% piperazine, and balance water was made and served as a surrogate compound for aMDEA®.

The $CO_2$ removal efficiency experiment was performed by pressurizing the system to 20 bar (a) (300 psia) using a 20 vol % $CO_2$ in $N_2$ mixture. Once the targeted pressure was reached and the $CO_2$ analyzer read the concentration of $CO_2$ at the absorber outlet at a constant value around 20%, the gas flow rate was adjusted to 200 sccm. Fresh solvent was fed to the column at a controlled rate to capture $CO_2$ from the mixed gas. The $CO_2$ absorption was conducted at room temperature.

Figure 5A:
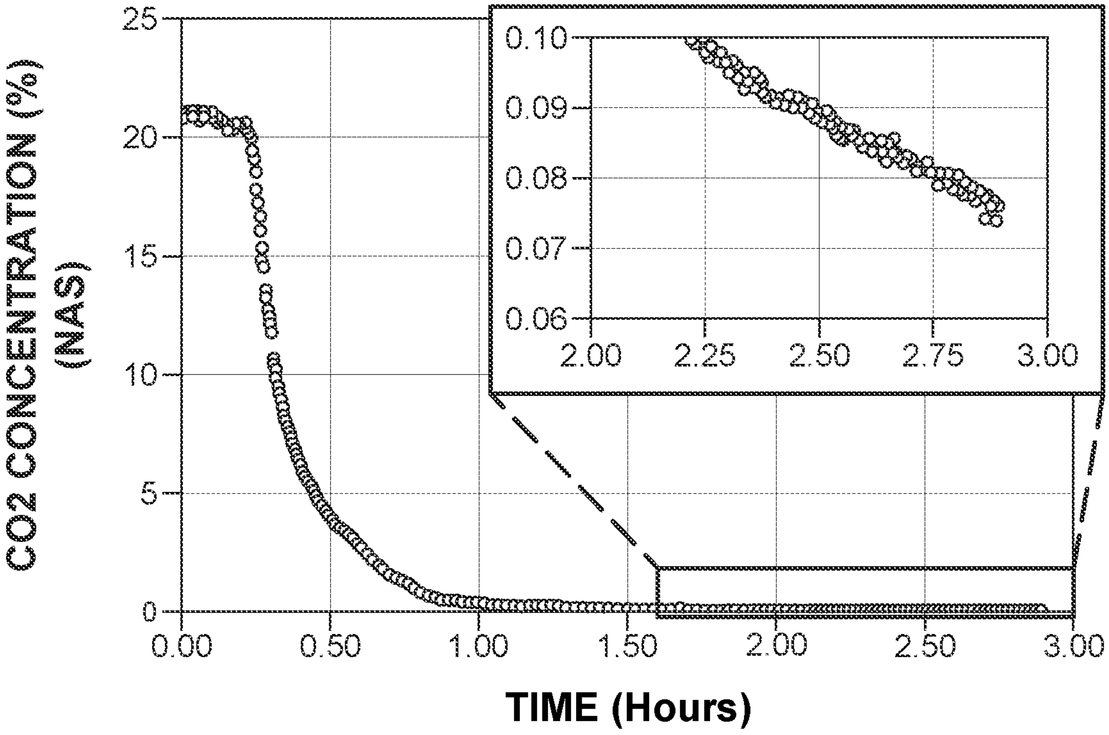
FIGS. 5A-5C are line graphs showing $CO_2$ concentration over time using an exemplary solvent system (FIG. 5A), an aMDEA surrogate (FIG. 5B) and water (FIG. 5C) in Example 1.
Figure 5B:
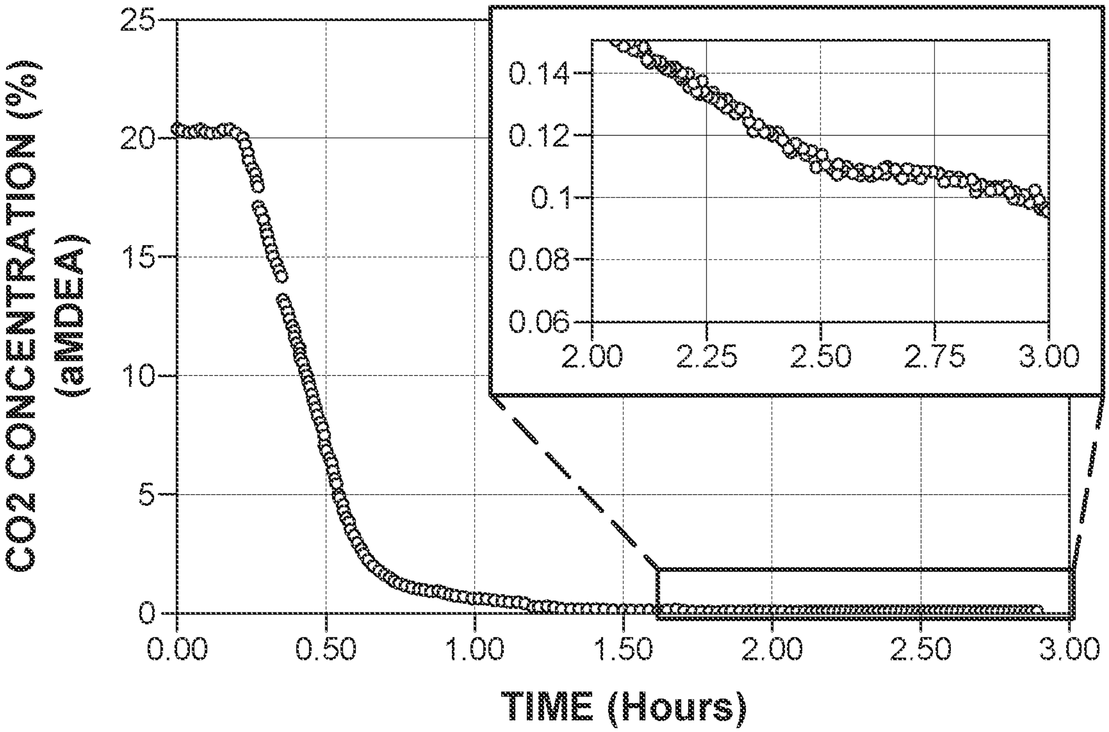
Figure 5C:
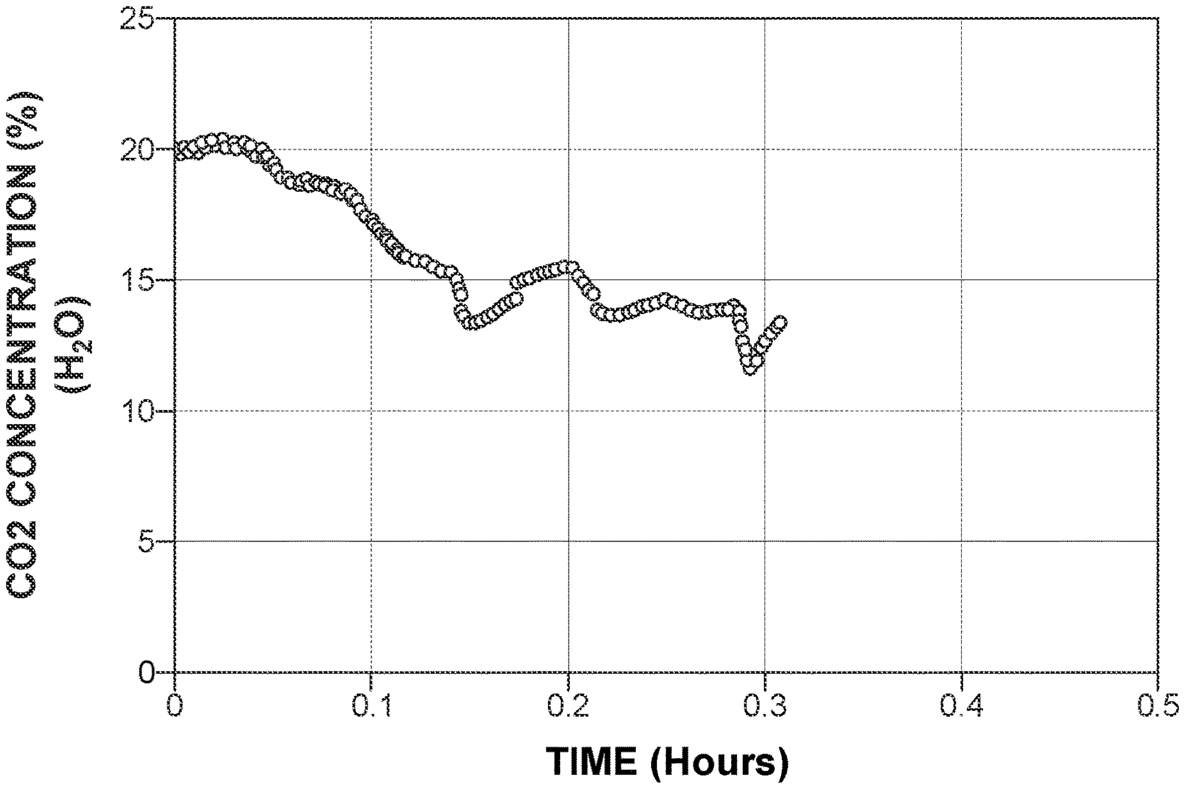

A summary of the different solvents evaluated and their $CO_2$ removal performance are listed in Table 1. Water (Run A1) was used to determine the performance by the physical absorption of $CO_2$ in the water under high pressure conditions. The results suggest that only 30% of the $CO_2$ was absorbed using water which is minimal compared to the required deep removal of more than 99% of the $CO_2$. An aMDEA surrogate was tested with a liquid flow rate of 2.4 and 3.3 g/min (Run A2 and A3, respectively), resulting in deep $CO_2$ capture of more than 99%. Decreasing the aMDEA surrogate liquid flow rate to 2.4 g/min produced a treated gas stream with a higher $CO_2$ concentration of 1100 ppm compared to 800 ppm at the higher flow rate of 3.3 g/min. The exemplary solvent system, Run A4, showed comparable removal efficiency to that reported for aMDEA surrogate at a similar liquid flow rate. It is noted that the exemplary solvent system experiment was terminated before a steady $CO_2$ profile was achieved due to control issues with the solvent pump. FIGS. 5A-5C are line graphs showing $CO_2$ concentration over time using the exemplary solvent system (FIG. 5A), the aMDEA surrogate (FIG. 5B) and water (FIG. 5C). Based on the results, it is expected that a low $CO_2$ level of 750-800 ppm could be achieved at steady state using the exemplary solvent system.

TABLE 1

Summary of the solvents tested in the high-pressure absorber and their $CO_2$ removal performance.

| | unit | water | aMDEA surrogate | aMDEA surrogate | NAS |
|---|---|---|---|---|---|
| Run no. | | A1 | A2 | A3 | A4 |
| Column pressure | bar, a | 20 | 20 | 20 | 20 |
| Temperature | ° C. | 22 | 22 | 22 | 22 |
| Gas flow rate | sccm | 200 | 200 | 200 | 200 |
| Liquid flow rate | g/min | 6.5 | 2.4 | 3.3 | 3.2 |
| L/G ratio (by mass) | | 25.8 | 9.5 | 13.1 | 12.7 |
| Feed gas $CO_2$ conc. | vol % | 20 | 20 | 20 | 20 |
| Abs. outlet $CO_2$ conc. | ppm | 140,000 | 1100 | 800 | 900 |
| $CO_2$ removal efficiency | % | 34.88 | 99.56 | 99.68 | 99.64 |
| Run time | h | 2 | 2 | 1 | 2.5 |

Example 2—$CO_2$ Vapor-Liquid Equilibrium Study

Figure 6:
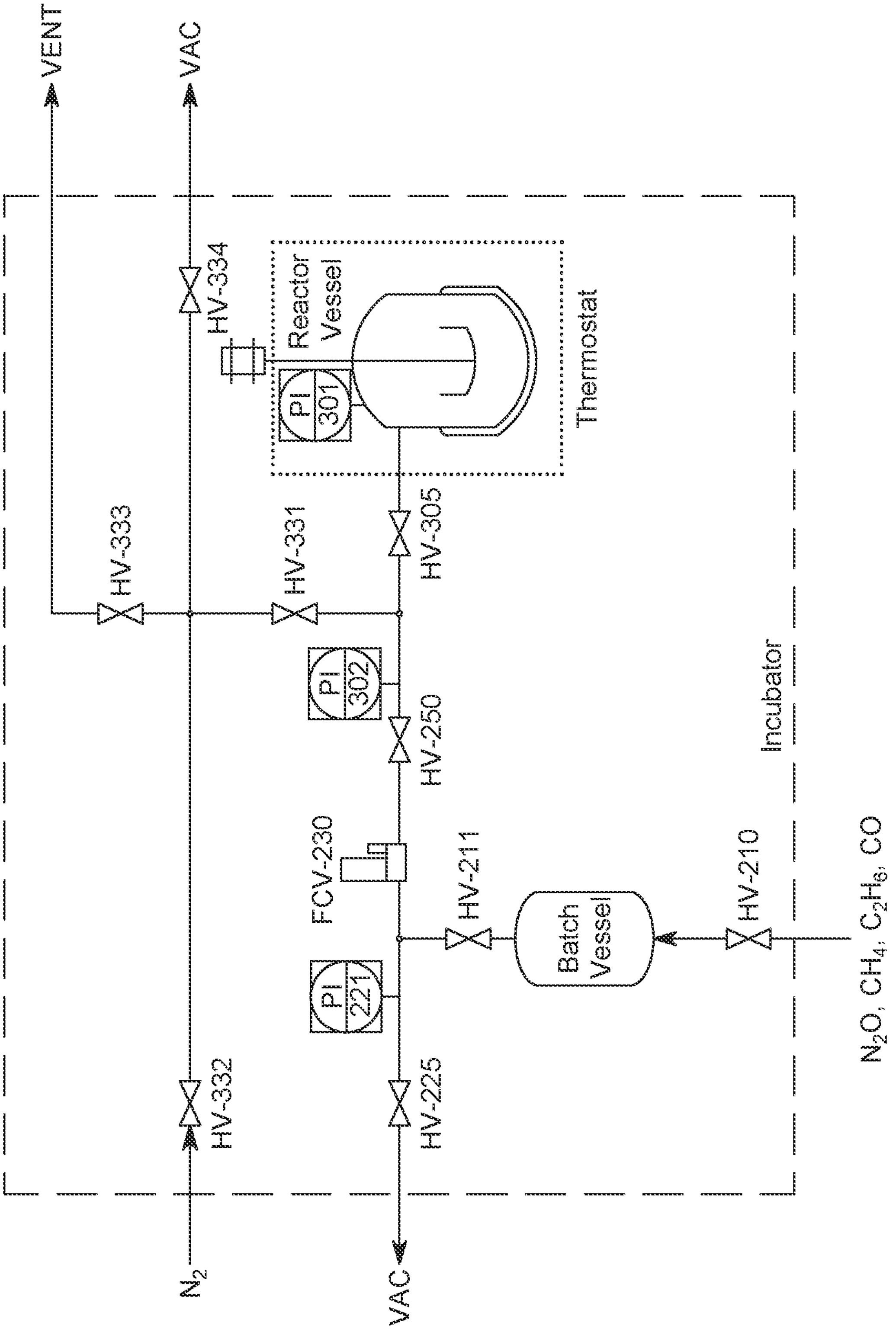
FIG. 6 is a schematic diagram showing the experimental set-up for Example 2, which included a reactor and a batch vessel.

The $CO_2$ vapor-liquid equilibrium for an exemplary embodiment of the solvent system was measured in a computer controlled, stirred reactor vessel supplied by Chemisens modified with an automated gas handling system. FIG. 6 is a schematic diagram showing the experimental set-up, which included a reactor and a batch vessel. The reactor was a 260 mL cylindrical stainless steel vessel with propeller stirrers and four blades to mix both the liquid and gas phases. The speed of stirring could be varied to the desired value with an accuracy of ±1 rpm. The temperature of the reactor was maintained by a propylene glycol bath at the desired isothermal condition. The pressure of the reactor was monitored by a pressure transducer (PI-301) with an accuracy of +0.03% FSO. The reactor was connected to a solenoid valve (HV-305) to supply the desired gas into the reactor at isothermal condition from a 178 mL batch vessel. Between valve (HV-305) and the batch vessel, a mass flow controller, a solenoid valve (HV-250), and a pressure transducer (PI-302) were installed to control the flow rate and monitor pressure in the reactor inlet section. The pressure in the batch vessel was measured by a pressure transducer (PI-221). A flow control valve (FCV-230) was used to control the flow from the batch vessel to the manifold and reactor by opening a solenoid valve (HV-211). Gases to the batch vessel were supplied through valve (HV-210) from the desired gas cylinders. Additionally, a set of solenoid valves (HV-225, HV-331, HV-334, HV-332 and HV-333) were used to purge the system with nitrogen ($N_2$) and to pull vacuum to degas the solvent before the experiment and to vent the system. The reactor set-up was placed inside an incubator that was maintained at a constant temperature of 30° C. to avoid temperature fluctuations.

To measure the $CO_2$ isotherms, 100 mL of solvent was loaded into the SS reactor and subjected to degassing. The degassing was performed by repeating 7 to 8 cycles of purging the cell with $N_2$ followed by vacuum conditions. After degassing, $CO_2$ was injected into the reactor and allowed to reach vapor liquid equilibrium, which was indicated by a constant pressure reading in the reactor cell. The experiment proceeded with subsequent injections until the overall pressure of the reactor reached approximately 300 psia.

Figure 7:
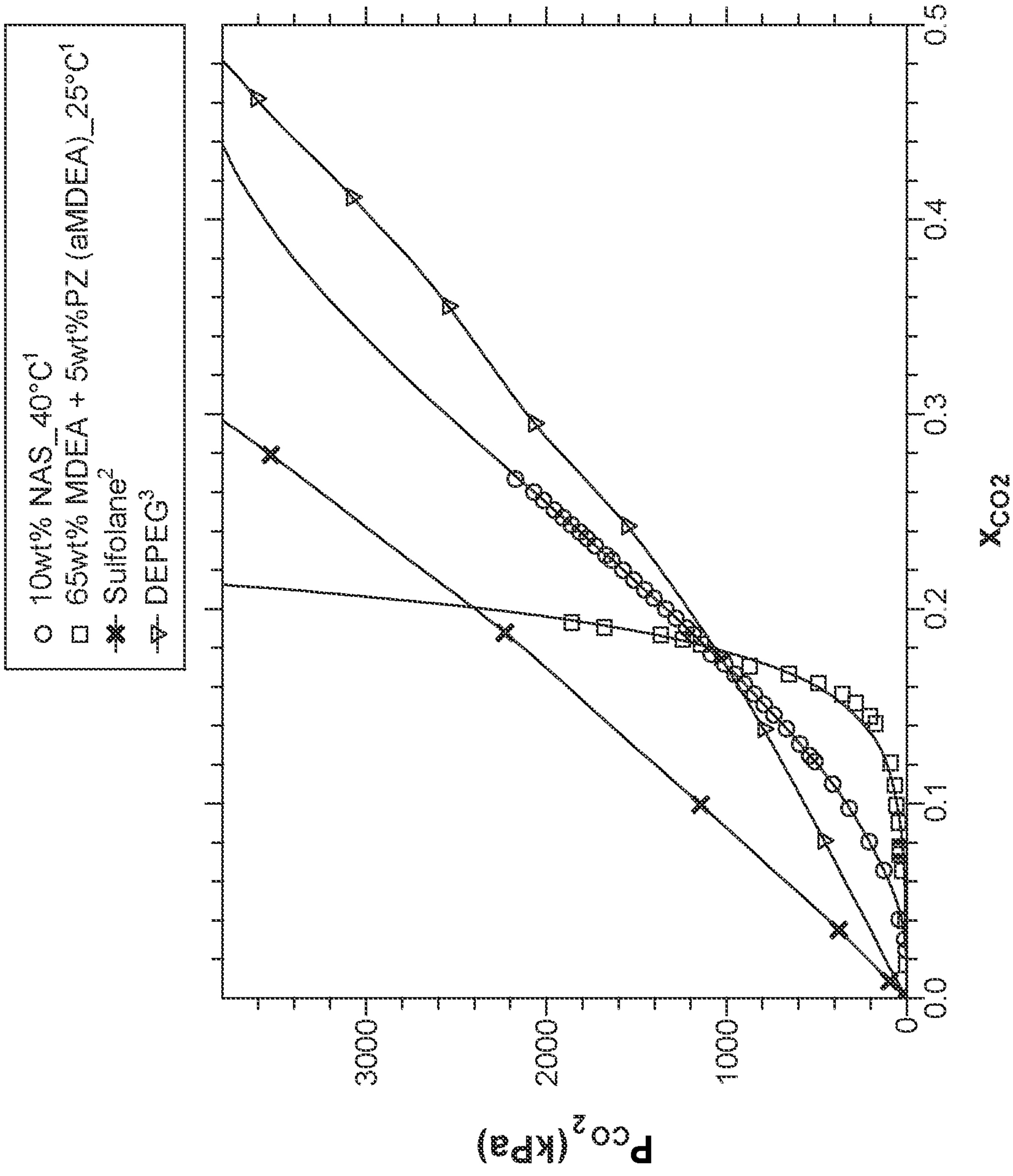
FIG. 7 is a line graph showing vapor liquid equilibrium curves for an exemplary embodiment of the solvent system, aMDEAR, Sulfolane and DEPG.

The $CO_2$ vapor liquid equilibrium (VLE) for the exemplary embodiment of the solvent system was measured and plotted in FIG. 7. FIG. 7 also includes VLE curves for aMDEAR, Sulfolane (which is a cyclic sulfone with the formula $(CH_2)_4SO_2$) and DEPG (which is a mixture of dimethyl ethers of polyethylene), which were not measured but were found in literature sources. aMDEA is a chemical absorption solvent while Sulfolane and DEPG are physical absorption solvents. The exemplary embodiment of the solvent system is a hybrid solvent that can absorb $CO_2$ by both chemical and physical absorption modes.

While the chemical absorption solvents can achieve a deep scrubbing of $CO_2$ at low $CO_2$ concentrations, their absorption capacity is limited to the available amine in the solvent to chemically react with the $CO_2$. Chemical absorption is independent from system pressure. In testing, the aMDEA exhibited a saturation capacity around 0.2 mol-$CO_2$/mol-solvent at 600 kPa. Increasing pressure did not improve the $CO_2$ loading beyond the saturation point due to the limited physical solubility of $CO_2$ in water.

Physical solvents generally perform poorly removing $CO_2$ from a diluted gas stream. However, absorption capacity increases linearly as the system pressure increases. The exemplary embodiment of the solvent system was able to perform a deep $CO_2$ capture even when the concentration of $CO_2$ was relatively low. It was also able to increase $CO_2$ removal capacity upon increasing pressure.

The ability to perform the $CO_2$ absorption in a broad pressure range is an advantage of the solvent system described herein over aMDEA and other aqueous amine-based solvents. This advantage is particularly relevant for removing $CO_2$ from high pressure gas, such as, for example, a $CO_2$-laden syngas stream. Because the solvent system has a higher $CO_2$ removal capacity at increased pressures (i.e., is able to absorb more $CO_2$ from the gas stream), less solvent is needed to remove the same amount of $CO_2$. Accordingly, the footprint of the scrubbing process can be reduced because a smaller solvent inventory can be used. Further, because of the regeneration capability of the solvent system described herein, a packed column regenerator can be replaced with a smaller flash vessel equipped with heating coils to regenerate the solvent system. This replacement results in lower equipment cost and simplified operations.

With the solvent system described herein, the chemical absorption component maintains the deep scrubbing capability enabled by chemical absorbents, but the regeneration energy is much less than that of an aqueous amine-based solvent, such as aMDEA, that work solely by chemical absorption. With the described solvent system, the bulk of $CO_2$ is captured by the physical absorption component of the solvent system (as opposed to the chemical absorption component) and is thus removed by flashing rather than by heating. Calculations indicate a 30% energy savings for every kg of $CO_2$ removed from rich solvent for regeneration of the solvent using a flash tank rather than the aMDEA regeneration process.

Figure 8:
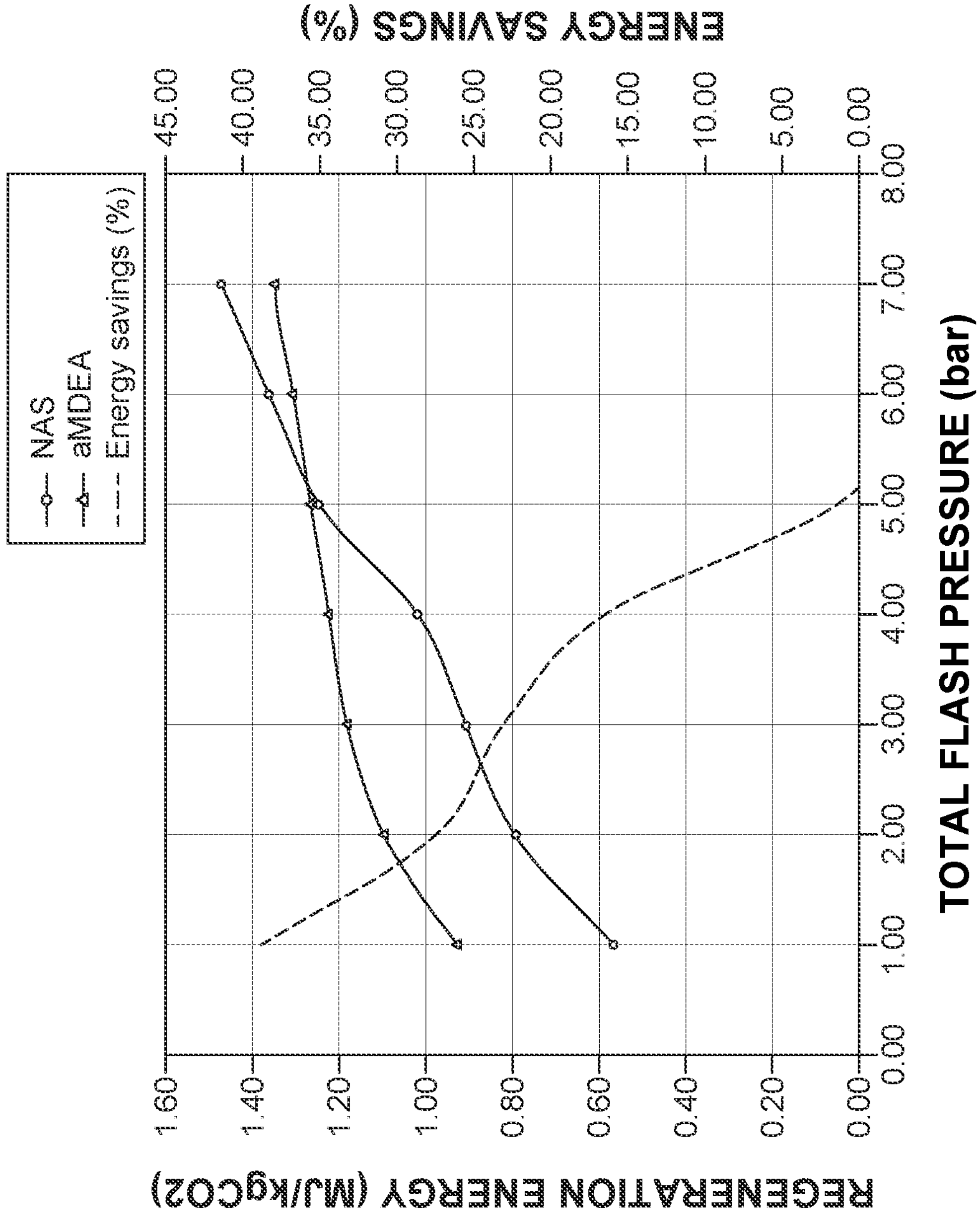
FIG. 8 is a line graph showing estimated regeneration energy to produce $CO_2$ at different pressures for an exemplary embodiment of the solvent system and aMDEA.

Calculations were performed to evaluate the impact of target $CO_2$ product pressure on energy use for solvent regeneration. FIG. 8 is a line graph showing estimated regeneration energy to produce $CO_2$ at different pressures for an exemplary embodiment of the solvent system and aMDEA. For the calculations, a basis of removing 100 mol-$CO_2$ from the solvent was used. For the solvent system, it was assumed that a portion of the $CO_2$ would be removed by flashing (for the physical absorption component) and the remaining portion would be removed by supplying heat for regeneration (for the chemical absorption component). The amount of $CO_2$ removed via flashing was calculated by determining the difference in the $CO_2$ loading ($X_{CO2}$) at an initial pressure of 10 bar (a) and the $CO_2$ loading at a given flash pressure. It was assumed that no energy is required for removing $CO_2$ by flashing. The energy required to remove the remaining $CO_2$ was determined by multiplying the heat of absorption of $CO_2$ ($dH_{abs,NAS}$=80 KJ/mol-$CO_2$ for the solvent system and $dH_{abs,aMDEA}$=60 KJ/mol-$CO_2$ for aMDEA) by the remaining amount of $CO_2$. The heat of absorption of the components was measured for the amine in the formulation using a calorimeter. Based on the calculations, a reduction in regeneration energy of up to 40% can be realized by using the solvent system if pure $CO_2$ was to be produced at an atmospheric pressure. The energy-saving benefit of the solvent system starts to diminish as the targeted $CO_2$ product pressure increases and reaches a break-even with aMDEA at 5 bar (a). This result is due to a smaller portion of physically-bound $CO_2$ being removed at higher regeneration pressure as well as more energy being required to regenerate the chemically-bound $CO_2$. It is to be noted that these estimations account for only heat of absorption while the sensible heat required to heat the solvent to the regeneration temperature was not included since the contribution of the sensible heat is estimated to be relatively small (<20%) to the overall energy requirement and is similar for different solvents.

Figure 9:
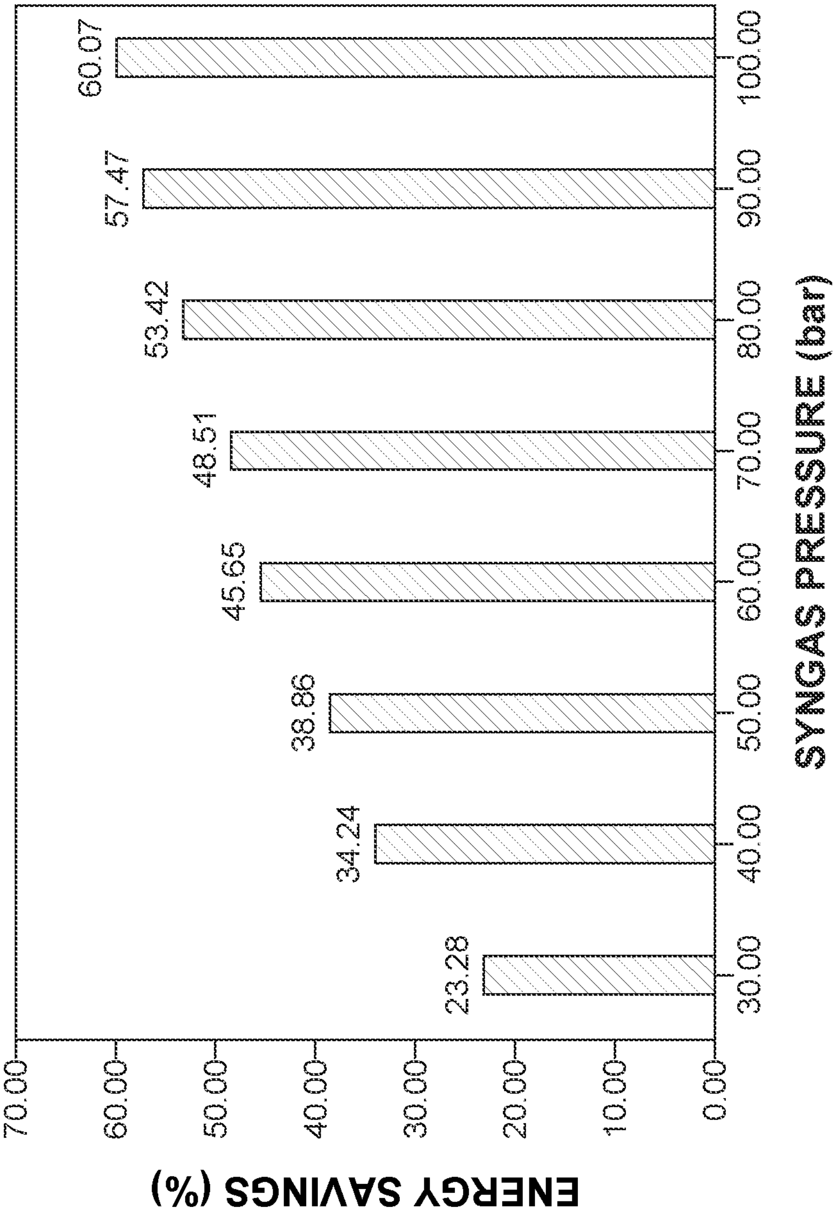
FIG. 9 is a bar chart showing the calculated energy savings for varying syngas feed pressures.

The effect of syngas feed pressure on energy use for regeneration was also examined. FIG. 9 is a bar chart showing the calculated energy savings for varying syngas feed pressures. For the calculations, the feed gas pressure was varied from 30 to 100 bar, a at increments of 10 bar. The target pressure for regenerated $CO_2$ was fixed at 1 bar, a. The calculations showed that as feed gas pressure increased, the solvent system described herein required less regeneration energy than aMDEA. For the calculations, the same approach described above was used to determine the energy required for regeneration of the solvent. As described above, the calculation determines the amount of energy required to regenerate chemically absorbed $CO_2$. The calculations assumed a concentration of $CO_2$ at 20 vol % for all syngas pressures. For the solvent system, as syngas pressure increases, a larger portion of the $CO_2$ is absorbed by physical absorption thus resulting in a larger portion of the absorbed $CO_2$ being removable by flashing. In contrast, aMDEA has a $CO_2$ saturation limit of 0.2 mol-$CO_2$/mol-solvent regardless of pressure. As such, the bulk of absorbed-$CO_2$ must be removed thermally (i.e., small difference between the $x_{CO2}$ of initial and final pressures)

For the solvent system described herein, the chemical absorption component allows the solvent system to achieve a deep $CO_2$ scrubbing similar to aMDEA. Furthermore, the physical absorption component provides additional $CO_2$ removal capacity under an elevated pressure where the chemical absorption solvents, including aMDEA, are limited in their removal capacity to the $CO_2$-amine reaction stoichiometry. To regenerate the solvent system, the bulk of $CO_2$ can be removed by simply flashing the solvent while only a small portion of chemically-bound $CO_2$ needs to be removed thermally. The situation is reversed for aMDEA, as the majority of the $CO_2$ is removed through thermal regeneration. Thus, utilizing the solvent system provides potential savings from the reduced energy usage for such an application.

Numerous modifications and variations of the invention are possible in light of the above teachings. It is therefore to be understood that within the scope of the appended claims, the invention may be practiced otherwise than as specifically described herein.

The invention claimed is:

1. A non-aqueous solvent system configured to remove an acidic gas from a gas stream at a pressure of at least 10 bar, the solvent system comprising a solution formed of a chemical absorption component comprising a nitrogenous base, wherein the nitrogenous base has a structure such that it reacts with a portion of the acidic gas and wherein the nitrogenous base comprises 1,4-diazabicyclo-undec-7-ene ("DBU"); 1,4-diazabicyclo-2,2,2-octane; piperazine ("PZ"); triethylamine ("TEA"); 1,1,3,3-tetramethyl guanidine ("TMG"); 1,8-diazabicycloundec-7-ene; monoethanolamine ("MEA"); diethylamine ("DEA"); ethylenediamine ("EDA"); 1,3-diamino propane; 1,4-diaminobutane; hexamethylenediamine; 1,7-diaminoheptane; diethanolamine; diisopropylamine ("DIPA"); 4-aminopyridine; pentylamine; hexylamine; heptylamine; octylamine; nonylamine; decylamine; tert-octylamine; dioctylamine; dihexylamine; 2-ethyl-1-hexylamine; 2-fluorophenethylamine; 3-fluorophenethyl amine; 3,5-difluorobenzylamine; N-methylbenzylamine; 3-fluoro-N-methylbenzylamine; 4-fluoro-N-methylbenzylamine; imidazole; benzimidazole; N-methyl imidazole; 1-trifluoroacetylimidazole; 1,2,3-triazole; 1,2,4-triazole; or mixtures thereof; and a physical absorption component comprising an organic diluent that is non-reactive with the acidic gas and that has a structure such that it absorbs a portion of the acidic gas at a pressure of at least 10 bar, wherein the organic diluent consists of polyethylene glycol di-methyl ether and optionally one or more additional polyethylene glycol dialkyl ethers different from polyethylene glycol di-methyl ether, wherein the solvent system has a solubility with water of less than about 10 g of solvent per 100 mL of water, and wherein, when the solvent system is contacted with the gas stream at the pressure of at least 10 bar, a ratio of acidic gas absorbed by the physical absorption component relative to acidic gas absorbed by the chemical absorption component is in a range of 1.5:1 to 30:1.

2. The solvent system of claim 1, wherein the nitrogenous base comprises N-methylbenzylamine.

3. The solvent system of claim 1, wherein the chemical absorption component is present in a concentration ranging from 1 to 50 wt % relative to the total system.

4. The solvent system of claim 3, wherein the concentration of chemical absorption component ranges from 5 to 30 wt % of the total system.

5. The solvent system of claim 4, wherein the concentration of chemical absorption component ranges from 10 to 20 wt % of the total system.

6. The solvent system of claim 1, wherein the physical absorption component is present in a concentration ranging from 40 to 95 wt % relative to the total system.

7. The solvent system of claim 6, wherein the concentration of physical absorption component ranges from 50 to 90 wt % of the total system.

8. The solvent system of claim 7, wherein the concentration of physical absorption component ranges from 70 to 90 wt % of the total system.

9. The solvent system of claim 1, the system further comprising water.

10. The solvent system of claim 9, wherein water is present in a concentration ranging from 1 to 10 wt % of the total system.

11. The solvent system of claim 9, wherein the components are present in the following concentrations:

1 to 20 wt % chemical absorption component 70 to 98 wt % physical absorption component, and 1 to 10 wt % water.

12. The solvent system of claim 1, wherein the acidic gas comprises carbon dioxide ($CO_2$), carbonyl sulfide (COS), carbon disulfide ($CS_2$), sulfur oxides ($SO_x$) or a combination thereof.

13. The solvent system of claim 1, having a dynamic viscosity ranging from 1 to 30 mPa s at a temperature of 10 to 60° C.

14. The solvent system of claim 1, having a vapor pressure ranging from 0.02 to 0.03 mbar at 20° C.

15. The solvent system of claim 1, having a boiling point ranging from 180 to 250° C.

* * * * *